Sept. 17, 1935.　　　　M. MALLORY　　　　2,014,771
TWO-STROKE CYCLE INTERNAL COMBUSTION ENGINE
Filed April 23, 1934　　　3 Sheets-Sheet 3
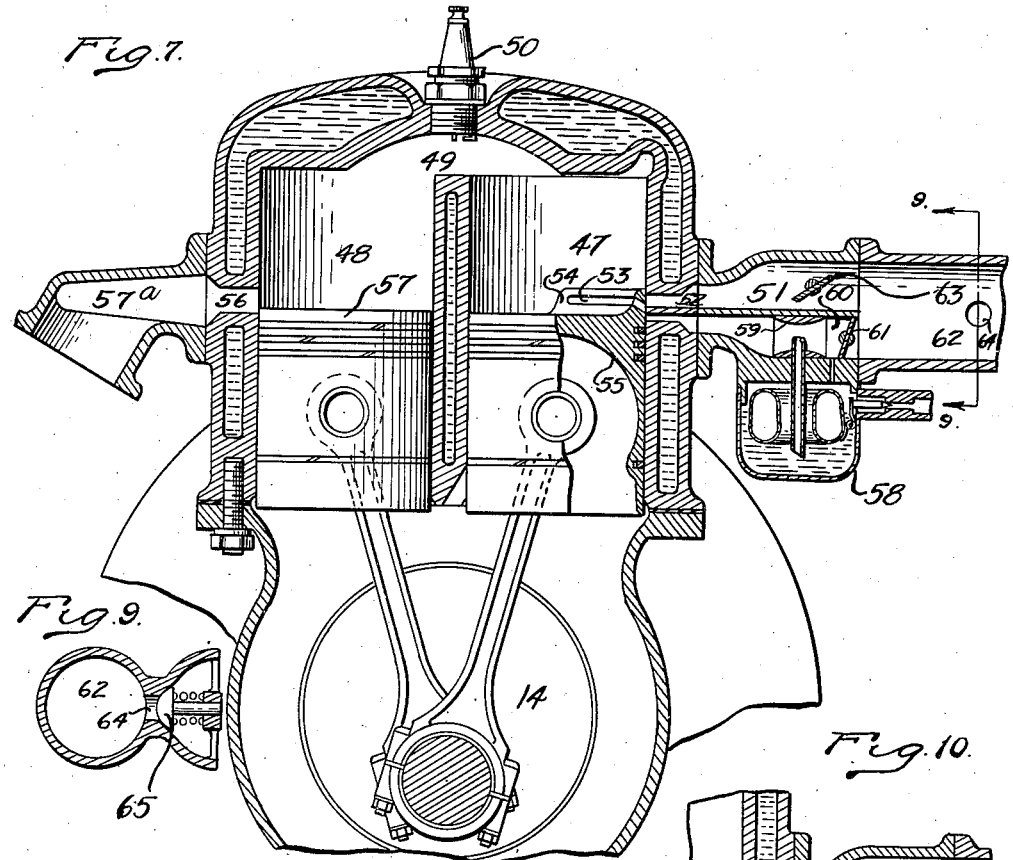
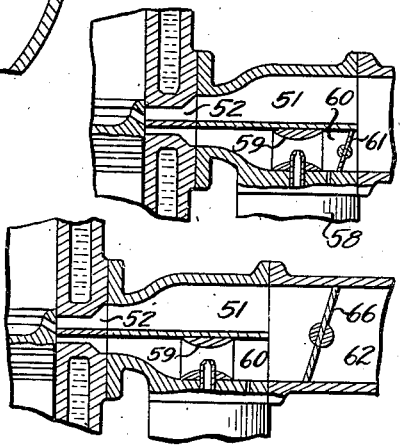
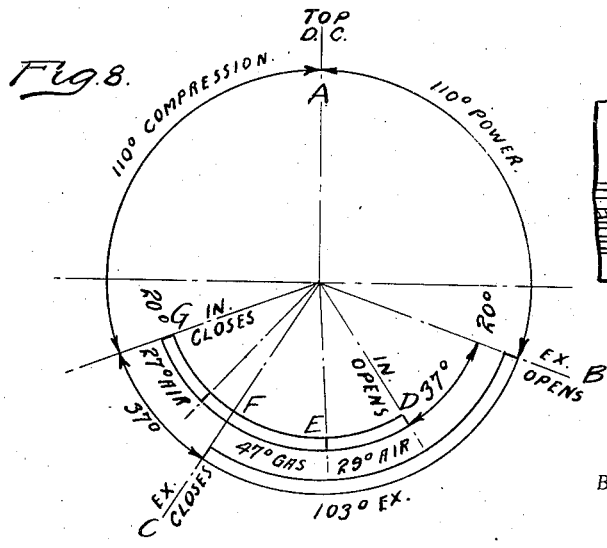
INVENTOR.
MARION MALLORY.
BY
ATTORNEY.

Patented Sept. 17, 1935

2,014,771

UNITED STATES PATENT OFFICE 2,014,771

TWO-STROKE CYCLE INTERNAL COMBUSTION ENGINE

Marion Mallory, Detroit, Mich., assignor to Mallory Research Company, Toledo, Ohio, a corporation of Delaware Application April 23, 1934, Serial No. 721,931

5 Claims. (Cl. 123—53)

The object of this invention is to provide charging and scavenging means for a two-cycle engine, so that air can be admitted to the cylinder to move the exhaust gases towards and out of the exhaust port. Then, a combustible mixture is admitted under the air to further scavenge the cylinder of burnt gases. Later another charge of air is admitted under the combustible mixture which completely scavenges the burnt gases. The explosive mixture is thus sandwiched in between two layers of air.

Another object of this invention is to admit a charge of air under pressure into the cylinder of a two-cycle engine immediately after the exhaust port opens in front of the explosive mixture so that the burning gases or exhaust gases will not cause the incoming explosive mixture to ignite.

Another object of this invention is to admit a charge of air into the cylinder under pressure in front of the explosive charge to prevent waste of unburnt fuel being blown out of the exhaust port.

Another object of this invention is to provide means for charging a two-cycle engine with high pressure and completely scavenge the engine of all exhaust gases so that the engine will run cool.

Another object of this invention is to provide a two-cycle engine that takes in a charge of pure air, then a charge of combustible mixture, and later, another charge of air so that when the pistons have compressed the mixture, there will be in and around the spark plugs a rich explosive mixture, and, on top of the pistons, a very lean mixture consisting mostly of pure air.

Another object of this invention is to provide charging means for a two-cycle engine so that the explosive charge, consisting of air and fuel, can be regulated independently of the air charge so as to reduce the explosive charge more than the air charge to prevent a reduction in compression when the engine is operating under light loads when the explosive mixture is reduced.

Fig. 3 is a plan view taken on the plane 3—3 of Fig. 1.

Fig. 4 is a detailed view of the carburetor taken on plane 4—4 of Fig. 1.

Fig. 5 is a plan view looking down on the carburetor.

Fig. 6 is a plan view looking up on the carburetor.

Fig. 7 is a cross-sectional elevation showing an alternative construction.

Fig. 8 shows the cycle of operation diagrammatically.

Fig. 9 shows a pressure relief valve, being a cross-sectional elevation on plane 9—9 of Fig. 7.

Fig. 10 shows a modification of the carburetor throttle arrangements.

Fig. 11 shows another modification of the carburetor throttle arrangements.

In the figures:—

Figure 1:
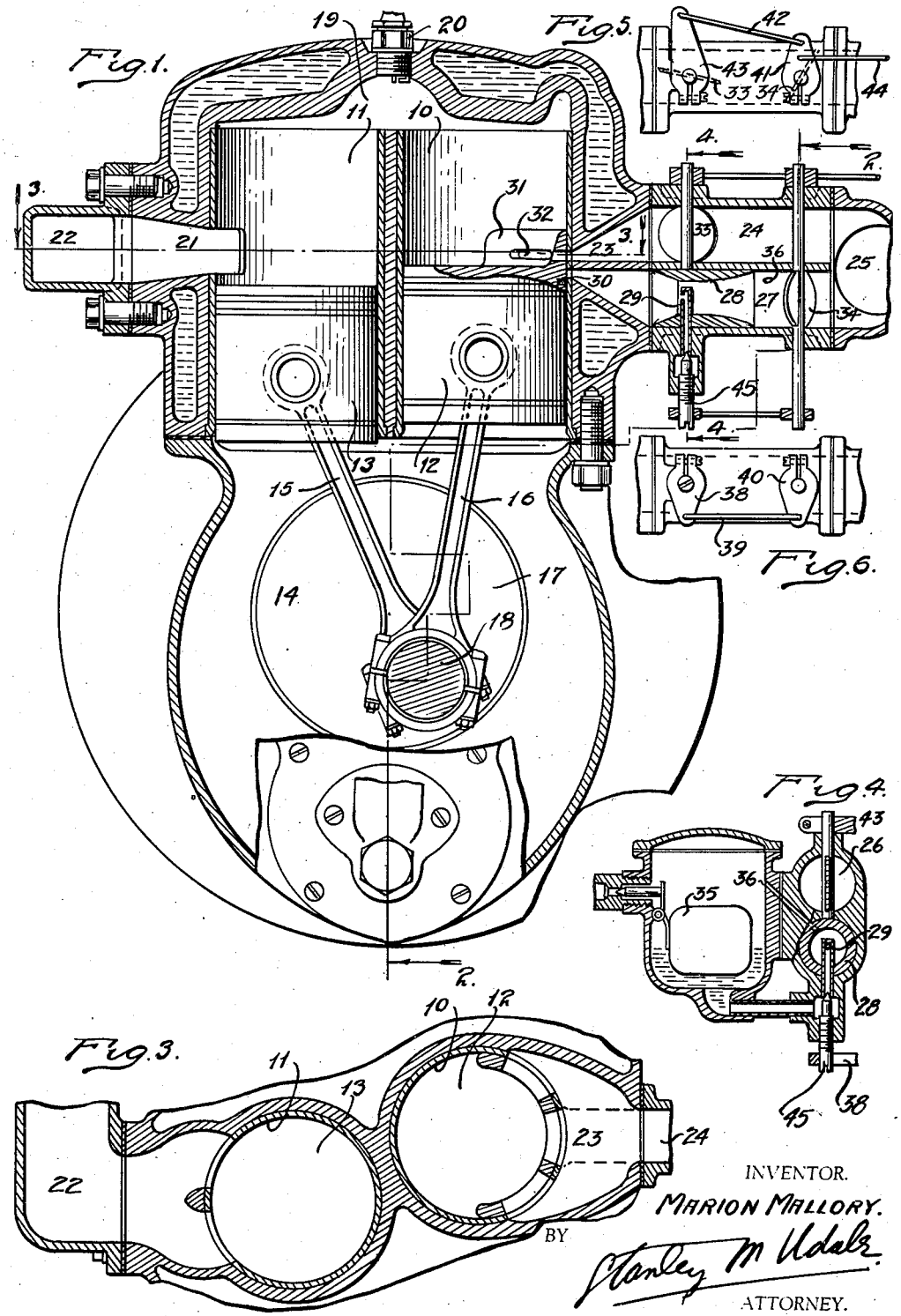
Fig. 1 is a cross-sectional elevation taken on the plane 1—1 of Fig. 2.

10 is one cylinder, 11 is the other. These two cylinders communicate with each other through a substantially hemispherical combustion chamber 19 in which a spark plug 20 is located. Thus the cylinder 10, the cylinder 11 and the chamber 19 collectively constitute a single compression chamber. A piston 12 reciprocates in the cylinder 10, and the piston 13 reciprocates in the cylinder 11. These pistons are operated by crank shaft 14, to which they are connected by the connecting rods 15—16; the connecting rods being connected through the crank pin 18. An exhaust port 21 is located in the cylinder 11, which discharges into the exhaust manifold 22.

The inlet arrangements are shown at the right of Fig. 1, consisting of an air entrance 23, connected to an air conduit 24, which, in its turn, is connected to a compressed air main 25, which obtains compressed air from the supercharger 26, which is driven from the crank shaft 14.

Figure 2:
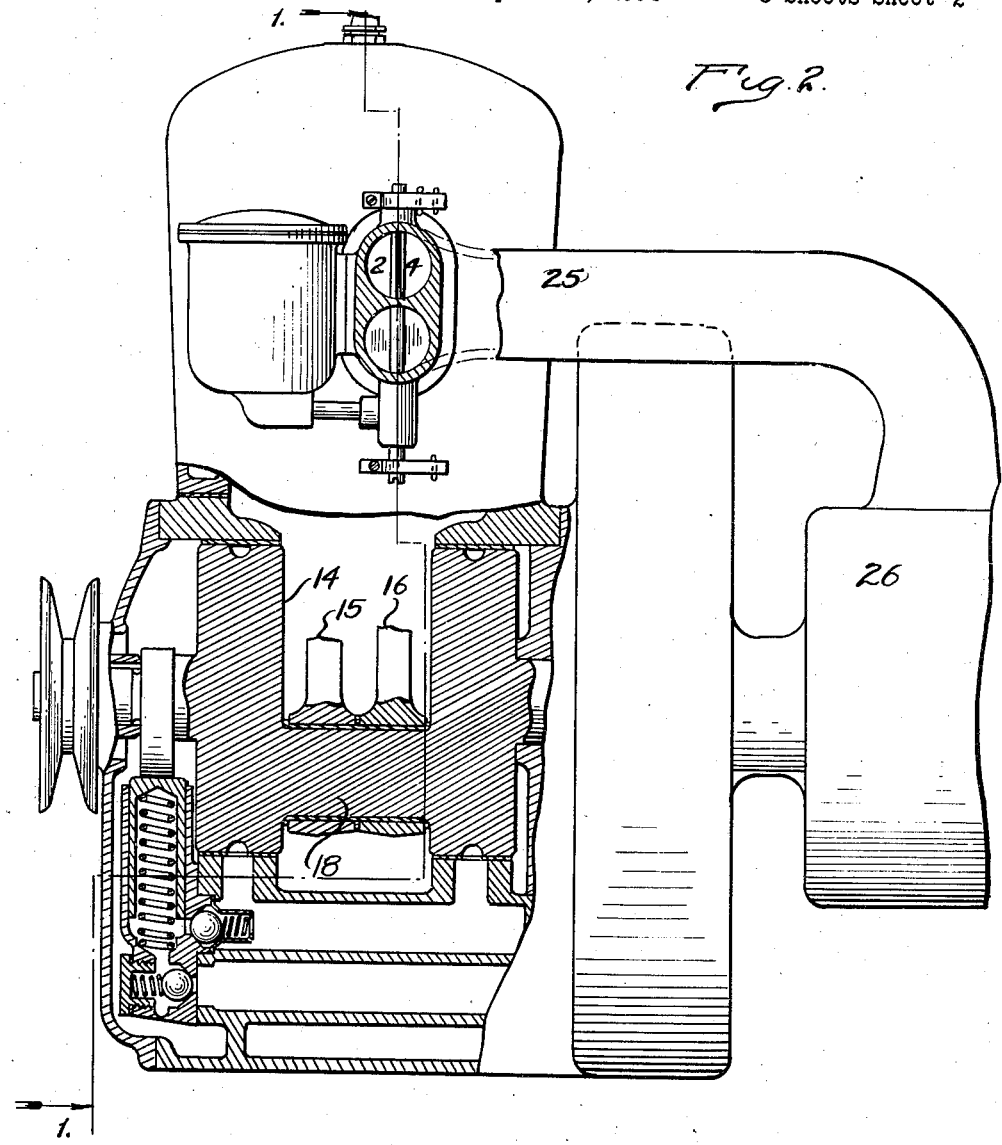
Fig. 2 is a cross-sectional elevation taken on the plane 2—2 of Fig. 1.

In Fig. 2, 25 is the compressed air conduit leading to the venturi 28 in which discharges the fuel nozzle 29. The mixture enters through the port 30. A projection 31 on the end of the piston 12 is provided with an opening 32, which acts as an inlet opening to the cylinder 10.

In Fig 1, the port 23 is shown opposite the port 32 so that compressed air can be admitted to the cylinder 10 during the time the piston 13 uncovers the exhaust port 21. A throttle 33 controls the admission of compressed air. A similar throttle 34 controls the admission of compressed air to the carburetor consisting of the fuel nozzle 29 and the venturi 28.

In Fig. 4, a float chamber 35 supplies fuel to the fuel nozzle 29. A passage 36 at the air entrance 27 admits compressed air to the upper portion of float chamber 35. The two throttles 33 and 34 are inter-connected by the linkage 38, 39, 40, 41, 42 and 43, in such a manner that one throttle opens as the other closes.

See Figs. 1, 5 and 6. 44 is the throttle rod that controls this mechanism. A needle valve 45 is provided to control the flow of fuel from the float chamber 35 to the fuel nozzle 29. This needle valve is also connected with the throttle mechanism through the links 38, 39, 40, 41, 42 and 43, so that as more air is admitted to the carburetor through 34 more fuel is admitted to the nozzle past the needle valve 45.

Lubricating means are shown in Fig. 2, but, as they are no part of this invention, they have not been numbered.

In Fig. 7, cylinder 47 communicates with another cylinder 48, through a combustion chamber 49 in which is located a spark plug 50. A compressed air conduit 51 communicates with a cylinder port 52, which port is shown in alignment with a port 53 formed in the lip 54 of the piston 55. An exhaust port 56 is uncovered by the piston 57, and this port 56 communicates with an exhaust manifold 57a. A carburetor 58 discharges ino a venturi 59 located in a conduit 60, th air flow to which is controlled by a throttle 61. A large port 62 admits compressed air to both 51 and 60. This conduit is controlled by a throttle valve 63. A relief port 64 (see Fig. 9) is controlled by a pressure relief valve 65. Alternatively the valve 65 can be opened by the closing of the valve 61 by mechanical means.

In Fig. 10, a conduit 51 is in free communication with the compressed air supercharger 26; otherwise Fig. 10 is similar to the construction shown in Fig. 7.

In Fig. 11, both conduit 51 and 60 are controlled by a single master throttle 66 located in the main air entrance 62.

In Fig. 8 a cycle operation is shown, which starting at A, the mixture expands to B when the exhaust port 56 is opened. This exhaust port remains open until C 103° later. At D, the port 52 opens. At E, the port 52 closes and the carburetor 58 discharges its rich mixture into the cylinder through the port 53. At F, the port 53 on the piston cuts off the supply of fuel and air and re-admits compressed air from 52, which remains open until G, from which point to A the mixture is compressed in the usual manner.

In Fig. 5, it will be noticed that the link 43 is larger than the link 41; thus the compressed air control throttle 33 closes at a slower rate than the mixture control throttle 34 opens, with the result that the throttle 33 is never completely closed even when the mixture throttle 34 is wide open.

Although I prefer to operate the inlet valves by means of two ports in the cylinder and one in the piston, I can accomplish the same result by valves operated by the engine shaft.

What I claim is:—

1. A two-stroke cycle internal combustion engine, comprising a source of compressed air, two communicating cylinders, a piston reciprocating in unison in each cylinder, ports in the walls of each of said cylinders located so as to be uncovered by said pistons, one port in one cylinder serving as the exhaust, two ports in the other cylinder, the first being located ahead of the second, the one first being connected to the compressed air, a carburetor connected to the second port and to the compressed air, means for covering the first port as the second port is uncovered.

2. A two-stroke internal combustion engine comprising a chamber including a cylinder, a piston reciprocating in said cylinder, a port in said piston communicating with said cylinder and covered by the cylinder walls, two ports located in one side of said cylinder one above the other so as to be successively uncovered and covered by the port in said piston, a conduit for admitting compressed air to the first port to be opened, a conduit for admitting a compressed explosive charge to the second port to be opened, an exhaust outlet from said chamber, and means for opening said outlet immediately before the compressed air is admitted to said cylinder.

3. An internal combustion engine as claimed in claim 2, in combination with a throttle valve in the conduit leading to the first port, a similar throttle in the conduit leading to the second port, means for opening one throttle valve while closing the other to simultaneously control the compressed air and the compressed fuel mixture charges, so that as the mixture charge is increased, the compressed air charge is decreased.

4. In an internal combustion engine, a cylinder, a piston reciprocable therein, means for admitting to the cylinder two charges of compressed air with a charge of fuel mixture therebetween, and means for varying the quantity of the compressed air charges in inverse ratio to the quantity of the fuel mixture charge.

5. A two-stroke cycle internal combustion engine comprising two communicating cylinders, one cylinder having an exhaust port, the other having two inlet ports, a source of compressed air having passageways leading to the respective inlet ports, a valve in each passageway, a fuel supply jet in one of said passageways between the valve and the inlet to the cylinder, and means for progressively closing either one of said valves as the other valve is opened.

MARION MALLORY.